United States Patent [19]

Dohmeier

[11] 4,106,542

[45] Aug. 15, 1978

[54] TIRE PROTECTIVE CHAINS

[75] Inventor: Hans Otto Dohmeier, Victoria, South Africa

[73] Assignee: Dome Inventions (Proprietary) Limited, Johannesburg, South Africa

[21] Appl. No.: 765,855

[22] Filed: Feb. 4, 1977

Related U.S. Application Data

[63] Continuation-in-part of Ser. No. 603,807, Aug. 12, 1975, abandoned.

[30] Foreign Application Priority Data

| Aug. 21, 1974 | [ZA] | South Africa | 74/5368 |
| Oct. 31, 1974 | [ZA] | South Africa | 74/7007 |
| Feb. 6, 1976 | [ZA] | South Africa | 76/0913 |

[51] Int. Cl.² ............................................. B60C 27/20
[52] U.S. Cl. ........................................ 152/239; 59/78; 152/243
[58] Field of Search ............... 152/243, 239, 242, 241, 152/244, 233; 59/35, 84, 87, 78, 80

[56] References Cited

U.S. PATENT DOCUMENTS

| 1,391,254 | 9/1921 | Hull | 152/243 |
| 2,107,431 | 2/1938 | Taylor | 152/243 |
| 2,223,942 | 12/1940 | McKinnon | 59/35 |
| 3,768,534 | 10/1973 | Gower | 152/239 |
| 3,783,923 | 1/1974 | Dohmeier | 152/243 |
| 3,830,054 | 8/1974 | Tamamura et al. | 59/84 |

FOREIGN PATENT DOCUMENTS 1,330,228  9/1973  United Kingdom .................... 59/78

Primary Examiner—Robert G. Sheridan
Assistant Examiner—Donald W. Underwood
Attorney, Agent, or Firm—Young & Thompson

[57] ABSTRACT

A tire chain comprising tread links formed with a perforation and connectors that are loops threaded through the perforations in three or more tread links interconnecting the tread links to form a network of closed figures. The connectors are loops of a carbon steel rod with the ends of the loops lapping each other and being welded together along the length of their adjacent surfaces. The tread links and connectors are of different carbon steels whereby after heat treating each is hardened throughout its thickness with the tread links having a surface hardness in the range 46 to 54 Rockwell C and the connectors having a core hardness in the range 15 to 35 Rockwell C.

9 Claims, 4 Drawing Figures

U.S. Patent
Aug. 15, 1978
4,106,542
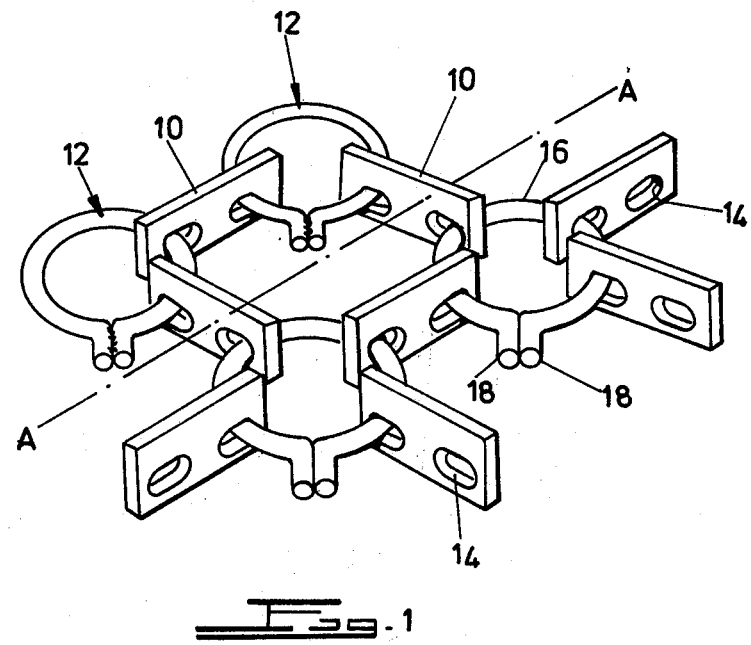
Fig. 1
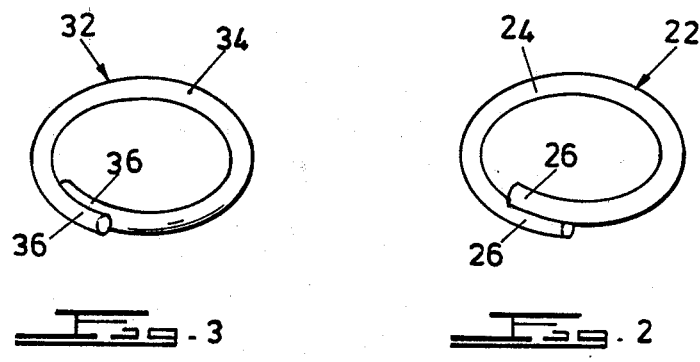
Fig. 3
Fig. 2
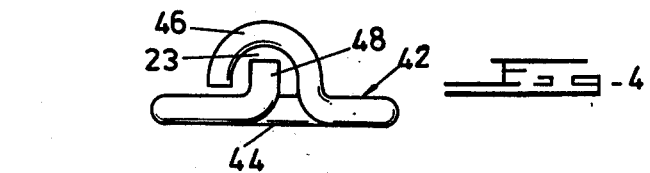
Fig. 4

TIRE PROTECTIVE CHAINS

RELATED APPLICATIONS

This application is a continuation-in-part of my co-pending application Ser. No. 603,807 filed Aug. 12, 1975, and now abandoned.

BACKGROUND TO THE INVENTION

This invention relates to tire protective chains for heavy-duty earth-moving vehicles fitted with rubber tires, the chains being used to protect the tire treads from damage, such as abrasion and cutting of the rubber, by rocks.

In a popular firm the tire protective chain comprises a network of tread links forming a pattern of closed figures and connectors engaged with the interconnecting the tread links at the corners of the figures. The links are preferably held to be substantially perpendicular to and the connectors substantially parallel to the surface of the tire. Each link may be a loop or, preferably, is a plate formed with a pair of perforations or a closed slot. Each connector is formed from a rod that is bent into a loop. The connectors are threaded through the perforations in the links, usually three or four links to each connector, before being closed by a bridging member or by welding.

Tire protective chains have a number of requirements. They must be strong, reliable, and hard-wearing and they must be suitable for production on an economic scale. As will be explained below, it has not, up till now, been possible to satisfy these requirements simultaneously in an acceptable manner. Satisfying these requirements involves, firstly, using welded rather than non-welded connectors. This is because welded connectors have been found to give a greater strength than and to be less expensive than non-welded connectors. Furthermore non-welded connectors limit undesirably the attainable density of the net. Secondly, satisfying these requirements involves choosing materials for the connectors and the links which will have suitable wearing characteristics and amenable to fabrication.

As far as the tread links are concerned there is little difficulty as they do not have to be welded and the material such as a heat-treated through-hardened carbon steel, cab be chosen for its wearing properties, e.g. see U.S. Pat. No. 3,870,094 (Schurle et al).

For the connectors the problem is not at all simple. Up till now butt-welded mild steel connectors that have been carburized or case-hardened have been used e.g. see U.S. Pat. No. 3,943,990 (Rieger). This is not because they are preferred but because of the serious practical difficulties of using carbon steel as discussed by Rieger.

These are a number of reasons whay carbon steel connectors have been found to be impracticable to weld. On the one hand it has been found to be unsuccessful to butt-weld carbon steel connectors by deposition welding because of the difficulty of performing the weld on a connector which may be up to 18 mm in cross-section, because such a weld is unreliable, and because this type of welding is labour intensive and commercially unattractive. On the other hand the welding can be made commercially attractive by forming the butt-weld using resistance welding requiment. However the machinery for this involves a considerable capital outlay, is not easily transportable, and cannot be operated away from a large power supply. A further and more significant problem of this technique is that during welding material to either side of the weld is converted to mild steel so that after treating, while the body of the connector is through-hardened, the weld and material to either side of the weld is merely case-hardened and there is no significant improvement over the use of mild steel.

For the above-discussed reasons case-hardened, mild steel, welded connectors have been used conventionally, but the applicant has found that these have a major disadvantage in that once the carburized zone has worn away and the mild steel exposed, the connectors wear and deteriorate rapidly so resulting in failure of the chain.

It is an object of the invention to provide a tire protective chain which satisfactorily resolves the problems of conventional protective chains.

SUMMARY OF THE INVENTION

According to one aspect of the invention there is provided a tire protective chain comprising an open network of tread links of a carbon steel and connectors interconnecting the tread links, the connectors each being formed from a length of rod bent into a loop with the ends of the loop welded together with the improvement that each connector is formed of a carbon steel with the ends of the loop lapping each other and being welded together along the length of their adjacent surfaces, the connectors being heat-treated to be hardened throughout their thickness.

This lapping of the ends of the loop ensures that the weld is extensive and therefore strong and that it is easy to perform using either deposition or resistance welding and is thus the key to using a carbon steel for the connectors.

The loop is generally circular and the ends of the loop may project radially from the centre of the loop or may be in the general shape of the loop. Thus in the first instance the weld, which may convert the carbon steel to a mild steel, is formed outside the loop so that the strength of the loop is unaffected. And on the other hand the weld, which is in the loop, includes a double thickness of material so that effectively the strength of the loop is again unaffected even though the carbon steel may be converted to mild steel.

In practice the links and connectors are interengaged, the connectors welded closed, and then the assembled chain is heat treated to remove stresses set up during welding of the connectors and to obtain a through-hardening of the links and connectors. For repair purposes the connectors may be heat treated to harden them prior to assembly in the chain; while this is not desirable the strength of the connector is not significantly diminished in this event.

It has been found that the same carbon steel can be used for the links and connectors. While this has been found to produce a chain with greatly improved performance characteristics over conventional or known protective chains, it has been found that this is not an optimal solution. For example the links and connectors can be hardened to be in the range 42 and 44 Rockwell C-scale (hereinafter termed "RC"). This have been found to be the upper limit for the connectors and the lower limit for the links.

Thus, according to another aspect, the invention provides that the links and connectors are made of different carbon steels whereby after heat treatment the links are relatively harder than the connectors.

Preferably the links have a surface hardness in the range 46 to 60 RC and the connectors have a core hardness of 15 to 40 RC. A more preferred range is surface hardness of 48 to 54 RC for the links and 25 to 34 RC for the core of the connectors. If the links have a work hardening property, say by the addition of manganese, then they are preferably in the range of 48 and 52 RC so that upon being hardened in use the links have hardnesses in the range 53 to 58 RC.

Further objects, advantages and details of the invention will follow from the following description, claims and drawings.

DRAWINGS

FIG. 1 shows a perspective view of a tire protective chain according to the invention, connectors of part of the drawing being shown as being deposition welded and connectors of the other part as being resistance welded;

FIG. 2 shows a variant of connector for the chain of FIG. 1;

FIG. 3 shows a further variant of connector; and

FIG. 4 shows yet another variant of connector in side elevation.

DETAILED DESCRIPTION OF THE DRAWINGS

FIG. 1 shows a portion of a tire chain including a number of wearing or tread links 10 forming patterns of closed figures and connectors 12 engaged with and interconnecting the wearing links 10 at the corners of the figures. Four wearing links 10 are threaded on to each connector 12 to form a hexagonal pattern. Each link is engaged with two connectors so that it is held edge on to the tire and ground.

Each wearing link 10 is an elongate plate of a carbon steel formed with two slot shaped perforations 14 for receiving a connector 12 therethrough. The perforations 14 are positioned towards one side of the longitudinal axis of the wearing link so as to provide a large amount of material which may wear away before the wearing link becomes unservicable.

The perforations 14 may replaced by a single slot. In another form the wearing plate may be replaced by rings. The links may be fabricated or forged. These forms are not shown as they are well known to persons versed in the art.

Each connector 12 is formed from a carbon steel rod and includes an open ring portion 16 with limbs 18 extending radially outwardly from the ring and lapping each other. In practice, after wearing links 10 have been threaded on to the connectors, the connector is closed by welding the limbs 18 to each other along the length of their lapped portions. In FIG. 1 the connectors to one side of the line A—A are shown as being deposition welded and to the other side of the A—A are shown as being resistance welded.

FIG. 2 shows a variant of connector 22 in which there is a ring portion 24 and limbs 26 of the ring overlap one another in the curvature of the ring portion 24 each of the limbs being bent slightly out of the general plane of the ring. This ring is formed in a simple manner by cutting sections from a coil of carbon steel rod.

In FIG. 3 is shown a connector 32 similar to that of FIG. 2, but in which the limbs 36 of the ring portion 34 overlap each other and both are in the general plane of the ring, In practice this connector has one portion of the ring bent with a smaller radius than the remainder.

In FIG. 4 is shown a connector 42 that may be regarded as a development of the connector of FIG. 3. In this event the connector is composed of a ring portion 44 and limbs 46 and 48. The limb 46 is bent to form a hook which defines a recess and the limb 48 is bent to form a lug that projects into the recess in the limb 46. The limbs 46,48 thus engage each other mechanically.

The connectors 22,23, 42 are also closed using deposition or resistance welding.

The connectors 12,22, 32 and 42 each have lapping limbs or ends and the welding is performed along the length of the lapped portions. This permits a reliable welding of carbon steel which has been found to be impracticable previously. With the connectors 12, the welded portion is outside the ring portion. With the connectors 22,32, 42 the welded portion is inside the ring, but the amount of material is doubled and the weld is extensive.

An example of a tyre chain which has been tried with success had the following compositions of carbon steel:

Wearing Links 10: a carbon-steel sold in South Africa by Union Steel Corporation of South Africa Limited (USCO) under the trade reference E N 45 and having the following composition, the percentages being content by weight:

| | |
|---|---|
| Carbon | 0.50 – 0.60% |
| Silicon | 1.50 – 2.00% |
| Manganese | 0.70 – 1.00% |
| Sulphur | 0.50% approx. |
| Phosphorous | 0.50% approx. |

Connectors 12,22,32,42: High-tensile carbon steels sold in South Africa by USCO under the trade references E N 8 and E N 5 A, the percentages being content by weight:

| | E N 5A or | E N 8 |
|---|---|---|
| Carbon | 0.25 – 0.30% | 0.35 – 0.45% |
| Silicon | 0.05 – 0.35% | 0.05 – 0.35% |
| Manganese | 0.70 – 0.90% | 0.60 – 1.00% |
| Sulphur | 0.60% approx. | 0.60% approx. |
| Phosphorous | 0.60% approx. | 0.60% approx. |

In practice the chain is made as follows.

Firstly the links and connectors are formed and then assembled on a table, three, four or six links being threaded on to each connector to arrive at the desired pattern and mesh opening size. The overlapping ends of the connectors are then squeezed against each other, tack welded and then welded by deposition welding. Alternatively resistance welding may be used in which event the jaws through which the welding current is passed are also used to squeeze the ends together.

The assembled chain is then heat treated in the following steps. The reference to a "salt bath" refers to a carbon-nitrogen salt sold under the Trade Name "C-carbon-80" and having a high boiling point.

(1) The chain is heated and retained in a salt bath at 860° C for 4½ hours. This carburises the surfaces of the chain elements to a depth of 8mm.
(2) The chain is air cooled to room temperature.
(3) The chain is annealed to 700° C.
(4) The chain is re-heated to 450° C.
(5) The chain is again soaked in a salt bath at 840° C for a time calculated at 0.7 minutes/mm thickness.
(6) The chain is quenched in oil.

(7) Finally, the chain is re-tempered so that the links of E N 45 steel have a hardness of 52–54 Rockwell C-scale and the connectors of E N 8 have a core hardness of 25 to 34 Rockwell C-scale.

The steels mentioned above because of the manganese contents have a "work-hardening" property so that in use it has been found that the hardness of the links and connectors increases by about 5–10% which has been found to be ideal for good wearing consistant with reliability.

The heat treatment described above is by way of example only. Other treatments have been tried with a degree of success. For example one treatment involves heating the chain in an oven at about 850° C and then passing a carbon-nitrogen gas into the oven for 4 to 5 hours, quenching in oil, and then tempering the chain to obtain the required hardness.

An important advantage of the chain of the invention is that both the connectors and the links are each hardened throughout their thickness. This means that wearing of the chain and rubbing of the links and connectors against one another will cause only a gradual deterioration of the chain in service. This must be seen in contrast to chains having hardened carbon steel links and mild steel surface-carburized connectors; such chains experience rapid failure once the carburized surface of the connectors have worn away, i.e. the mild steel connectors break.

The examples given above are of preferred steel alloys. However steels which have the following carbon contents may be used, the heat treatment being adjusted accordingly.

(i) wearing links ; carbon 0.45 to 0.65 % by weight
(ii) connectors ; carbon 0.25 to 0.45 % by weight.

Tests and performance results obtained by the applicant have found that for optimum performance the relative hardness should be maintained within the ranges specified in the claims. In particular it has been found that for the wearing links the surface hardness should not go above 60 Rockwell with work hardening otherwise the links will crack. Lower hardnesses may be used but then the service life of the links decreases. For the connectors the range of hardness is more flexible and is usually dependent on the application of the chain. If the chain is merely wrapped around the surface of a tyre then hardnesses in the upper range may be used as the connectors experience some abrasion and have to withstand twisting of the links about their longitudinal axis when the links come into contact with the ground surface. If the chain is at least partially embedded in the tread of a tyre, e.g. see U.S. Pat. No. 3,722,566 (Dohmeier), then the connectors may have hardness in the lower range. It has been found that the links perform excellently if they have a hardness in the range 53 to 58 Rockwell C-scale as a result of work-hardening.

Analyses of chains which have performed successfully have shown that the links have a relatively flat hardness profile or gradient, i.e. change in hardness from the core to the surface, while the connectors have a large profile or gradient. For this reason it has been found to be effective to specify the surface hardness of the links and the core hardness of the connectors, the latter because it is the total and not merely the surface hardness of each connector which determines its successfulness.

The following is an analysis of five successful chains. The term RC refers to Rockwell C-scale and the term VPN refers to the corresponding Vickers hardness test result:

| WEARING LINK | | CONNECTOR | |
|---|---|---|---|
| surface | core | surface | core |
| 494VPN 49RC | 494VPN 49RC | 418VPN 49RC | 306VPN 34RC |
| 516VPN 50RC | 494VPN 49RC | 509VPN 46RC | 268VPN 25RC |
| 540VPN 50RC | 516VPN 48RC | 429VPN 47RC | 280VPN 26RC |
| 483VPN 50RC | 473VON 50RC | 353VPN 49RC | 313VPN 31RC |
| 516VPN 52RC | 494VPN 52RC | 391VPN 50RC | 321VPN 28RC |

The microstructure of all the samples was similar and consisted of fine martenite in the case of the wearing links, and in the case of the connectors tempered martensite, pearlite and ferrite.

I claim:

1. In a tire protective chain comprising an open network of tread links of a carbon steel forming a pattern of closed figures and arranged to be perpendicular to the surface of a tire and connectors interconnecting the tread links at the corners of the closed figures and arranged to be parallel to the surface of a tire, the connectors being loops that are threaded through perforations in the tread links and that are welded closed after being engaged with the tread links, the improvement that the tread links and connectors are of carbon steels that are different and which have been heat treated to be hardened throughout their thicknesses; that each connector is a loop having ends which lap each other and which are welded together; and that the tread links have a surface hardness of 46 to 60 Rockwell C-scale and the connectors a core hardness of 15 to 35 Rockwell C-scale.

2. A chain as claimed in claim 1, in which the tread links have a surface hardness of 48 to 54 Rockwell C-scale and the connectors have a core hardness of 25 to 34 Rockwell C-scale.

3. A chain as claimed in claim 1, in which the tread links have a carbon content of between 0.45 and 0.65 weight percent.

4. A chain as claimed in claim 1, in which the tread links have a carbon content of between 0.50 and 0.60 weight percent.

5. A chain as claimed in claim 1 in which the connectors have a carbon content of between 0.20 and 0.45 weight percent.

6. A chain as claimed in claim 1 in which the connectors have a carbon content of between 0.35 and 0.45 weight percent.

7. A chain as claimed in claim 1 in which the tread links have a manganese content of between 0.70 and 1.00 weight percent.

8. A chain as claimed in claim 1, in which the connectors have a manganese content of between 0.70 and 1.00 weight percent.

9. A chain as claimed in claim 1, in which the tread links have a work-hardening property and in which in service they develop a surface hardness in the range of 53 to 58 Rockwell C-scale.

* * * * *